US009515870B2

(12) United States Patent
Ryu et al.

(10) Patent No.: US 9,515,870 B2
(45) Date of Patent: Dec. 6, 2016

(54) METHOD FOR TRANSMITTING AND RECEIVING DATA IN WIRELESS ACCESS SYSTEM AND APPARATUS FOR SAME

(71) Applicants: LG ELECTRONICS INC., Seoul (KR); Research & Business Foundation Sungkyunkwan University, Suwon-si (KR)

(72) Inventors: Jongyeol Ryu, Daejeon (KR); Wan Choi, Seoul (KR); Dongin Kim, Seongnam-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 14/379,697

(22) PCT Filed: Nov. 6, 2012

(86) PCT No.: PCT/KR2012/009276
§ 371 (c)(1),
(2) Date: Aug. 19, 2014

(87) PCT Pub. No.: WO2013/125767
PCT Pub. Date: Aug. 29, 2013

(65) Prior Publication Data
US 2015/0012793 A1  Jan. 8, 2015

Related U.S. Application Data

(60) Provisional application No. 61/600,708, filed on Feb. 20, 2012.

(51) Int. Cl.
*H04L 1/08* (2006.01)
*H04W 72/12* (2009.01)
(Continued)

(52) U.S. Cl.
CPC ............ *H04L 41/0654* (2013.01); *H04L 1/08* (2013.01); *H04L 1/1825* (2013.01); *H04L 1/1854* (2013.01); *H04L 49/557* (2013.01); *H04W 72/1226* (2013.01); *H04L 2001/0097* (2013.01)

(58) Field of Classification Search
CPC ..................... H04W 72/1226; H04L 41/0654; H04L 1/08; H04L 49/557; H04L 1/1825; H04L 1/1854; H04L 2001/0097
See application file for complete search history.

(56) References Cited

U.S. PATENT DOCUMENTS

2006/0115015 A1 * 6/2006 Oh ..................... H04L 1/0656
375/267
2009/0287979 A1 * 11/2009 Wang ................. H04B 7/15521
714/752

(Continued)

OTHER PUBLICATIONS

ZTE, Discussion on Type II Relay HARQissues, R1-100541, 3GPP RAN WG1 #59bis, Jan. 18, 2010 See section 2 and figures 1-7.

(Continued)

*Primary Examiner* — Esaw Abraham
*Assistant Examiner* — Kyle Vallecillo
(74) *Attorney, Agent, or Firm* — Dentons US LLP

(57) ABSTRACT

Disclosed are a method for transmitting and receiving data in a wireless access system supporting relay nodes, and an apparatus for same. In particular, the present invention comprises the steps of: sending a request for a retransmission to an adjacent second terminal, in case the recovery of data from a first signal received from a base station fails due to interference by the second terminal adjacent to a first terminal; the first terminal receiving a second signal from the second terminal; and the first terminal recovering data from the first signal, using the second signal, wherein the base station schedules a terminal other than the first and second terminals at the point of transmitting the second signal.

8 Claims, 12 Drawing Sheets

(51) Int. Cl.
*H04L 12/939* (2013.01)
*H04L 12/24* (2006.01)
*H04L 1/18* (2006.01)
*H04L 1/00* (2006.01)

(56) References Cited

U.S. PATENT DOCUMENTS

| | | | | |
|---|---|---|---|---|
| 2010/0111018 A1* | 5/2010 | Chang | H04B 7/15585 | 370/329 |
| 2010/0182916 A1* | 7/2010 | Drewes | H04B 7/15521 | 370/252 |
| 2012/0113816 A1* | 5/2012 | Bhattad | H04L 5/0032 | 370/246 |
| 2012/0159279 A1* | 6/2012 | Braithwaite | H04W 84/047 | 714/751 |
| 2013/0132788 A1* | 5/2013 | Braun | H04L 1/1819 | 714/750 |
| 2014/0038653 A1* | 2/2014 | Mildh | H04W 28/048 | 455/501 |

OTHER PUBLICATIONS

Alcatel-Lucent, System Design Frameworks to Support Type II Relay Operation in LTE-A, R1-093355, 3GPP RAN WGI #58, Aug. 24, 2009, See sections 3.4.1, 4.4.1, figures 3 and 6.
ZTE, Discussion Type II Relay in LTE-A, R2-094702, 3GPP RAN WG2 #67, Aug. 24, 2009; See figure 1 and section 2.2.

* cited by examiner (a) Initial transmission  (b) Retransmission (a)

(b)

(a) Initial transmission (b) Retransmission

METHOD FOR TRANSMITTING AND RECEIVING DATA IN WIRELESS ACCESS SYSTEM AND APPARATUS FOR SAME

This application is a National Stage Entry of International Application No. PCT/KR2012/009276 filed Nov. 6, 2012, which claims priority to U.S. Provisional Application No. 61/600,708 filed Feb. 20, 2012, both of which are incorporated herein by reference.

FIELD OF THE INVENTION

The present invention relates to a wireless access system and, more particularly, to a method for transmitting and receiving data in a wireless access system supporting relay nodes, and an apparatus for same.

BACKGROUND ART

FIG. 1 illustrates RNs (Relay Nodes) and user equipments (UEs) existing in a base station region in a wireless communication system. The relay node refers to a node configured to intermediately receive a signal transmitted from a source node and to wirelessly relaying the received signal to a destination node. The relay node may be considered for data transmission rate coverage enhancement of the user equipment (or user terminal), group mobility, temporary network positioning, throughput enhancement in cell boundary area, and/or coverage provision within a new area. The user equipment may directly communicate with the base station, or the user equipment may perform communication communication with the base station over 2 hops through the relay node.

The relay node transmits the data received from the base station to a user equipment, which is located (or positioned) within a relay node area, and the relay node may transmit data received from the user equipment, which is located (or positioned) within a relay node area, to the base station. And, for simplicity in the description, a wireless link between the base station and the relay node will be referred to as a backhaul link. A link from the base station to the relay node will be referred to as a backhaul downlink, and a link from the relay node to the base station will be referred to as a backhaul uplink. Additionally, a wireless link between the relay node and the user equipment will be referred to as an access link. And, a link from the relay node to the user equipment will be referred to as an access downlink, and a link from the user equipment to the relay node will be referred to as an access uplink.

DETAILED DESCRIPTION OF THE INVENTION

Technical Objects

The present invention proposes a method for increasing transmission efficiency of an entire system by performing retransmission via inter-user cooperation (or coordination) respective to a case when inter-cell interference exists in a multi-cell downlink environment or via inter-user cooperation (or coordination) respective to a case when inter-user interference exists in a cell. More specifically, proposed herein is a method for having a user located (or positioned) at a cell edge retransmit his (or her) recovered signal, i.e., retransmit an interference element of a counterpart user, and having the user, who has received the recovered signal, remove (or eliminate) interference by using an interference removing (or eliminating) method, thereby recovering data by using the signal element having the interference removed therefrom. Additionally, proposed herein is a method for having the base station select users via efficient scheduling, so that the interference caused by such retransmission can be prevented from influencing the selected users.

The technical objects of the present invention will not be limited only to the objects described above. Accordingly, technical objects that have not been mentioned above or additional technical objects of the present application may become apparent to those having ordinary skill in the art from the description presented below.

Technical Solutions

In an aspect of the present invention, as a method for receiving data in a wireless access system, the method for receiving data includes, when a first user equipment fails to recover data from a first signal being received from a base station due to an interference caused by a second user equipment, having the first user equipment request for retransmission to a neighboring second user equipment, having the first user equipment receive a second signal from the second user equipment, and having the first user equipment recover the data from the first signal by using the second signal, and wherein user equipments other than the first user equipment and the second user equipment are scheduled by the base station at a time point when the second signal is transmitted.

In another aspect of the present invention, as a first user equipment configured to receive data in a wireless access system, a user equipment includes an RF (Radio Frequency) unit configured to transmit and receive radio signals, and a processor configured to request for retransmission to a neighboring second user equipment, when a first user equipment fails to recover data from a first signal being received from a base station due to an interference caused by a second user equipment, to receive a second signal from the second user equipment, and to recover the data from the first signal by using the second signal, and wherein user equipments other than the first user equipment and the second user equipment are scheduled by the base station at a time point when the second signal is transmitted.

Preferably, an interference element is subtracted from the first signal by using the second signal, the second signal corresponding to the interference element of the first signal, thereby recovering the data.

Preferably, data are recovered by combining the first signal and the second signal.

Preferably, an interference element is subtracted from the first signal by using a portion of the second signal, the portion of the second signal corresponding to an interference element of the first signal, and the data are recovered by combining the first signal and a remaining portion of the second signal excluding the portion of the second signal.

Preferably, when the first user equipment and the second user equipment are positioned in an area located at a distance equal to or greater than a threshold value from the base station, the other user equipments are positioned in areas each located at a distance lower than the threshold value from the base station.

Advantageous Effects

According to an exemplary embodiment of the present invention, by using a retransmission method via cooperation (or coordination) between neighboring cell users, information transmission efficiency of users located at a cell boundary may be enhanced. In the neighboring cell, a user having recovered its information may retransmit its recovered information, i.e., information corresponding to an interference of another user, when a user located in another cell and having failed to recover information requests for a retransmission. After receiving its interference element, as described above, when the corresponding user subtracts the interference element from its initially transmitted signal and attempts to recover information by using the interference-subtracted signal, transmission efficiency may be increased. Additionally, by scheduling users minimizing influence caused by interference, based upon a likelihood of information retransmission occurring between cell boundary users, the base station may enhance transmission efficiency of cell boundary users without degrading performance of the overall system, which is caused by the retransmission.

Moreover, the present invention may be applied in a user relay via cooperation of inter-cell users as well as a user relay via cooperation of inner-cell users. By retransmitting interference between users existing within the same cell, the transmission efficiency of a user, which has failed to receive information during the initial transmission, may be increased. While the retransmission is being performed, the base station may schedule users receiving less influence from the interference, which is caused by the retransmission process, so as to reduce the degradation in the overall system performed, which is caused by interference that occurs due to the retransmission process.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The accompanying drawings, which are included as a part of the detailed description in order to provide a further understanding of the present invention, provide exemplary embodiments of the present invention and describe the technical aspects of the present invention along with the detailed description.

BEST MODE FOR CARRYING OUT THE PRESENT INVENTION

Figure 1:
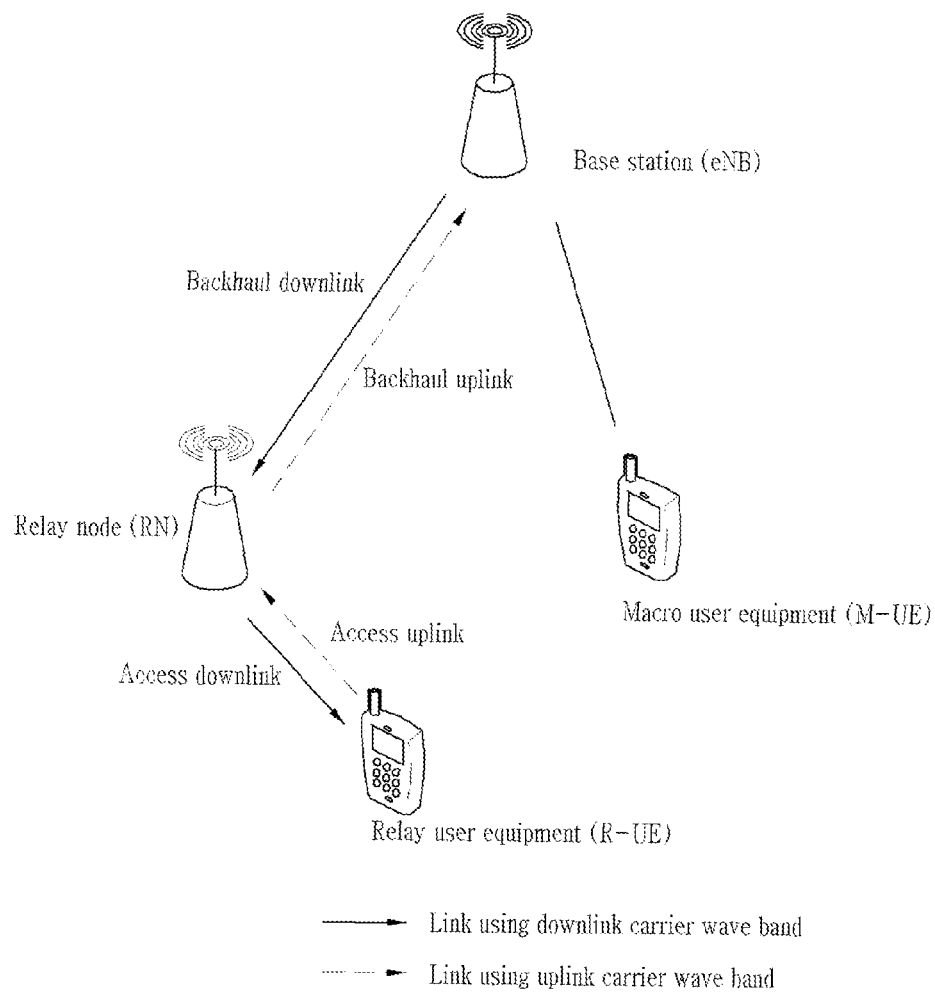
FIG. 1 illustrates a wireless communication system including a base station, a relay node, and a user equipment.

Hereinafter, the preferred embodiments of the present invention will now be described in detail with reference to the accompanying drawings. The detailed description of the present invention that is to be disclosed along with the appended drawings is merely given to provide to describe the exemplary embodiment of the present invention. In other words, the embodiments presented in this specification do not correspond to the only embodiments that can be realized according to the present invention. In the following description of the present invention, the description of detailed features of the present invention will be given in order to provide full and complete understanding of the present invention. However, it will be apparent to those skilled in the art that the present invention can be realized even without the detailed features described herein.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device.

In the description of the present invention, the embodiments of the present invention will be described by mainly focusing on the data transmission and reception relation between the base station and the terminal (or user equipment). Herein, the base station may refer to a terminal node of the network that performs direct communication with the terminal Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. The term 'Base Station (BS)' may be replaced by other terms, such as fixed station, Node B, eNode B (eNB), Access Point (AP), and so on. The term 'relay' may be replaced by terms including Relay Node (RN), Relay Station (RS), and so on. Additionally, the term 'Terminal' may be replaced by terms including UE (User Equipment), MS (Mobile Station), MSS (Mobile Subscriber Station), SS (Subscriber Station), AMS (Advanced Mobile Station), WT (Wireless terminal), MTC (Machine-Type Communication) device, M2M (Machine-to-Machine) device, D2D device (Device-to-Device) device, and so on.

The specific terms used in the following description of the present invention are provided to facilitate the understanding of the present invention. And, therefore, without deviating from the technical scope and spirit of the present invention, such specific terms may also be varied and/or replaced by other terms.

Herein, the embodiments of the present invention may be supported by at least one the disclosed standard documents for wireless access systems including the IEEE 802 system, the 3GPP LTE system, the LTE-A (LTE-Advanced) system, and the 3GPP2 system. More specifically, among the embodiments of the present invention, partial operation steps or structures of the present invention, which have been omitted from the description of the present invention in order to specify and clarify the technical scope and spirit of the present invention may also be supported by the above-described standard documents. Furthermore, the terms disclosed in the description of the present invention may be described based upon the above-mentioned standard documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Nevertheless, the scope and spirit of the present invention will not be limited only to those of the 3GPP LTE system and the 3GPP LTE-A system.

Figure 2:
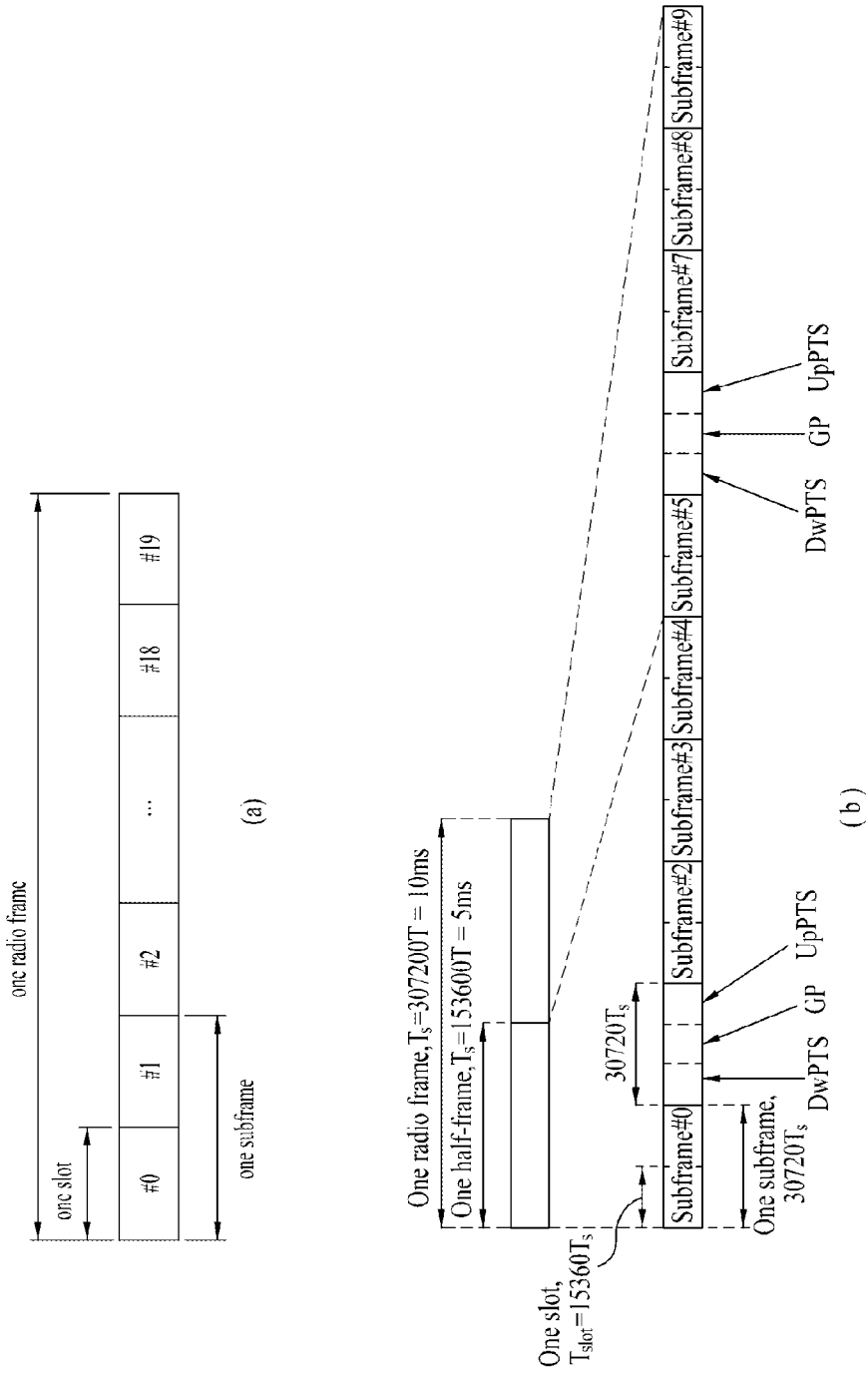
FIG. 2 illustrates a structure of a wireless frame being used in 3GPP LTE.

1. 3GPP LTE/LTE-A System to Which the Present Invention can be Applied 1. 1. General System FIG. 2 illustrates a structure of a wireless frame being used in 3GPP LTE.

In a cellular OFDM radio packet communication system, uplink/downlink data packet transmission is performed in subframe units, and once subframe is defined as a predetermined time period (or time section) including multiple OFDM symbols. The 3GPP LTE standard supports a Type 1 radio frame structure, which is applicable to FDD (Frequency Division Duplex), and a Type 2 radio frame structure, which is applicable to TDD (Time Division Duplex).

FIG. 2(a) illustrates an exemplary structure of a type 1 radio frame. A downlink radio (or wireless) frame is configured of 10 subframes, and one subframe is configured of 2 slots in a time domain. The time consumed (or taken) for one subframe to be transmitted is referred to as a TTI (transmission time interval). For example, the length of one subframe may be equal to 1 ms, and the length of one slot may be equal to 0.5 ms. One slot includes a plurality of OFDM (orthogonal frequency division multiplexing) symbols in the time domain and includes a plurality of Resource Blocks (RBs) in the frequency domain. Since the 3GPP LTE uses the OFDMA in a downlink, an OFDM symbol is used to indicate one symbol section. The OFDM symbol may also be referred to as an SC-FDMA symbol or a symbol section. As a resource allocation unit, a Resource Block (RB) may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot becomes smaller than when the OFDM symbol is configured of a normal CP. In case of the extended CP, for example, the number of OFDM symbols included in one slot may be equal to 6. In case the user equipment is moving at high speed, or in case the channel status is unstable, the extended CP may be used in order to further reduce the interference between the symbols.

In case of using the normal CP, since one slot includes 7 OFDM symbols, one subframe includes 14 OFDM symbols. At this point, the first maximum of 3 OFDM symbols of each subframe are allocated to a PDCCH (physical downlink control channel), and the remaining OFDM symbols may be allocated to a PDSCH (physical downlink shared channel).

(b) of FIG. 2 illustrates an exemplary structure of a type 2 radio frame. The type 2 radio frame consists of 2 half frames, each half frame is configured of 5 general subframes, and each subframe is configured of 2 slots. Most particularly, among the 5 subframes, a special subframe consists of a DwPTS (Downlink Pilot Time Slot), a Guard Period (GP), and a UpPTS (Uplink Pilot Time Slot). The DwPTS is used for performing initial cell search, synchronization or channel estimation in the user equipment. And, the UpPTS is used for matching a channel estimation performed in the based station with an uplink transmission synchronization performed in the user equipment. The guard period refers to a period for eliminating (or removing) interference that occurs in an uplink, due to a multiple path delay of a downlink signal between an uplink and a downlink.

The above-described structure of the radio frame is merely exemplary. And, therefore, the number of subframes included in the radio frame or the number of slots included in a subframe, and the number of symbols included in one slot may be diversely varied.

Figure 3:
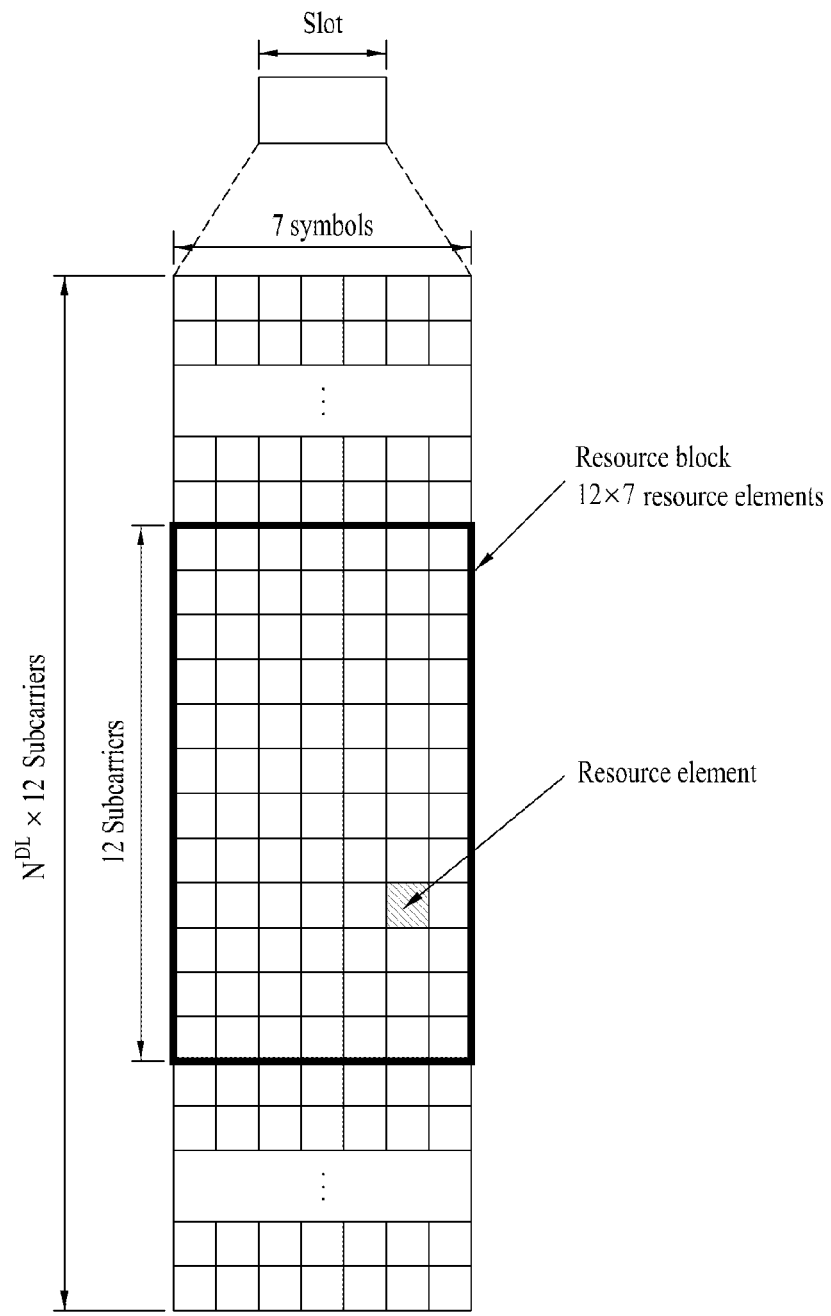
FIG. 3 illustrates an exemplary resource grid of a downlink slot.

FIG. 3 illustrates an exemplary resource grid of a downlink slot.

Referring to FIG. 3, a downlink slot includes multiple OFDM symbols in the time domain. Herein, one downlink slot may include 7 OFDM symbols in a time domain, and a resource block (RB) may include 12 sub-carriers in the frequency domain. Although this may be described as an example, the present invention will not be limited only to this.

Each element within the resource grid is referred to as a Resource Element (RE). One resource block includes 12×7 resource elements. NDL, which corresponds to a number of resource blocks included in a downlink slot, is dependent to a downlink transmission bandwidth. The structure of an uplink slot may be identical to the structure of the downlink slot.

Figure 4:
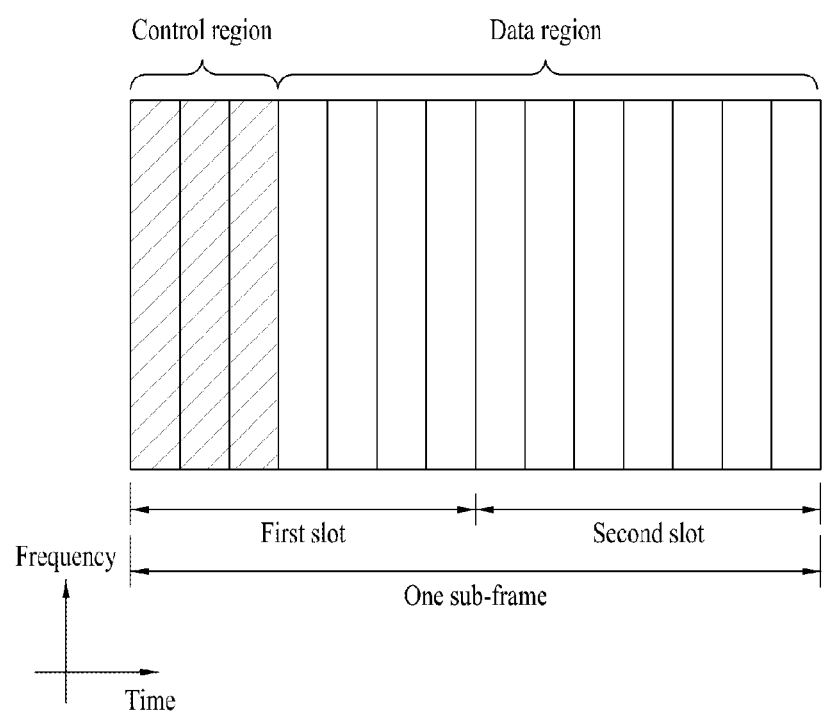
FIG. 4 illustrates a structure of a downlink subframe.

FIG. 4 illustrates a structure of a downlink subframe.

Referring to FIG. 4, a maximum of 3 OFDM symbols located at the front portion (or beginning) of a first slot within one subframe collectively corresponds to a control region, wherein a control channel is allocated (or assigned), and the remaining OFDM symbols collectively correspond to a data region, wherein a Physical Downlink Shared Channel (PDSCH) is assigned. Examples of the downlink control channels that are being used in the LTE system may include a Physical Control Format Indicator Channel (PC-FICH), a PDCCH, a Physical Hybrid automatic repeat request Indicator Channel (PHICH), and so on.

The PCFICH is transmitted from a first OFDM symbol of the subframe, and the PCFICH carries information on the number of OFDM symbols (i.e., size of the control region), which are being used for the transmission of control channels within the subframe. The PHICH corresponds to a response channel respective to the uplink, and the PHICH may carry an ACK (Acknowledgment)/NACK (Not-Acknowledgment) signal respective to an HARQ (Hybrid Automatic Repeat Request). The control information being transmitted through the PDCCH may be referred to as DCI (Downlink Control Information). Herein, the DCI may include uplink resource allocation information, downlink resource allocation information, or an uplink transmission (Tx) power control command respective to an arbitrary user equipment group.

Figure 5:
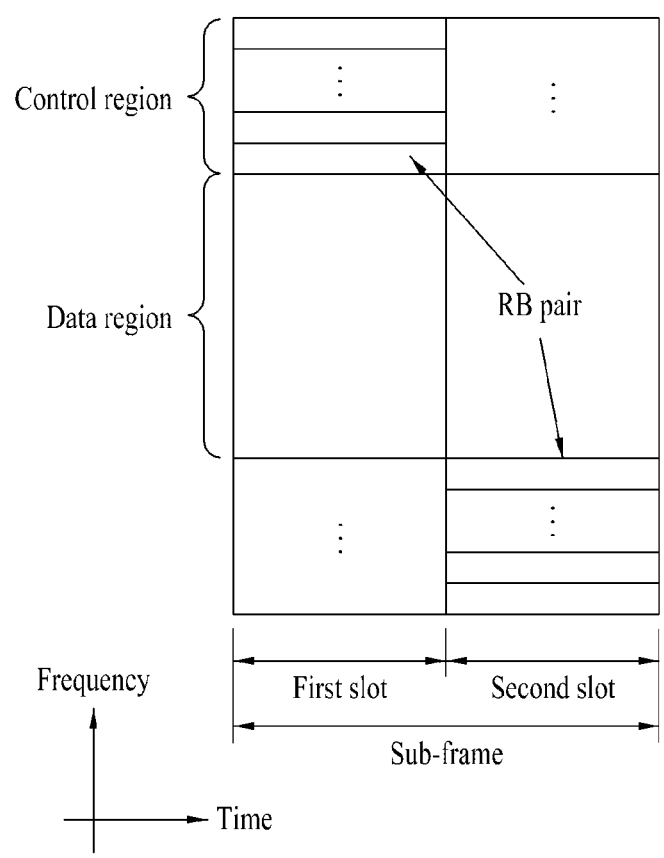
FIG. 5 illustrates a structure of an uplink subframe.

FIG. 5 illustrates a structure of an uplink subframe.

Referring to FIG. 5, a UL subframe may be divided into a data region and a control region in the frequency domain. A PUCCH (Physical Uplink Control Channel), which carries uplink control information, is allocated to the control region. And, a PUSCH (Physical Uplink Shared Channel), which carries user data, is allocated to the data region. In order to maintain the characteristics of a single carrier, one user equipment does not transmit a PUCCH and a PUSCH at the same time. A PUCCH respective to a user equipment is allocated with an RB pair in a subframe. And, the RBs belonging to the RB pair occupy different subcarriers in two slots. This may also be described (or expressed) as the RB pair, which is allocated to the PUCCH, being frequency-hopped at a slot boundary.

1. 2. Multiple Antenna (MIMO) System

Figure 6:
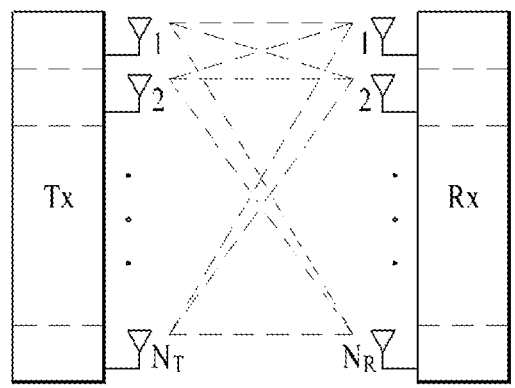
FIG. 6 and FIG. 7 illustrate structural views of a wireless communication system having multiple antennae.
Figure 7:
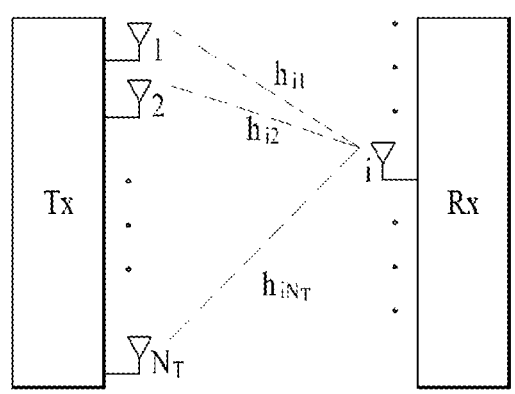

FIG. 6 illustrates structural views of a wireless communication system having multiple antennae.

As shown in FIG. 6(a), if the number of transmission antennae is increased to $N_T$, and, if the number of reception antenna is increased to $N_R$, unlike a case when multiple antennae can only be used in the transmitter or the receiver, a theoretical channel transmission capacity may be more increased in proportion to the number of antennae. Accordingly, a transmission rate may be enhanced, and a frequency efficiency may be outstandingly enhanced. With the increase in the channel transmission capacity, the transmission rate may theoretically increase as much as a maximum transmission rate ($R_o$) corresponding to when using a single antenna being multiplied by a rate increase rate ($R_i$).

$$R_i = \min(N_T, N_R) \quad \text{[Equation 1]}$$

For example, in a MIMO communication system using 4 transmission antennae and 4 reception antennae, a theoretical transmission rate 4 times that of a single antenna system may be acquired. Evidence of the theoretical capacity increase of the multiple antennae system was found and proven in the mid 90's. And, since then, diverse technologies for actually enhancing the data transmission rate have been under research and development. Additionally, some of the technologies are already being applied in diverse wireless communication standards, such as the $3^{rd}$ generation mobile communication and the next generation wireless LAN.

Up to now, the research and development associated to multiple antennae have been actively and diversely carried out in many aspects, such as research in the aspect of information theory associated to multiple antennae communication capacity calculation in diverse channel environments and multiple access environments, research in drawing out wireless channel measurements and models of a multiple antennae system, research in time/space signal processing technologies for enhancing transmission reliability and for enhancing the transmission rate, and so on.

The communication method in a multiple antennae system will be described in more detail by using a mathematical modeling. In the system, it will be assumed that $N_T$ number of transmission antennae and $N_R$ number of reception antennae exist.

In case of a transmitted signal (or transmission signal), when $N_T$ number of transmission antennae exist, a maximum number of information available for transmission is equal to $N_T$. And, the transmission information may be expressed as shown below.

$$s = [s_1, s_2, \ldots, s_{N_T}]^T \quad \text{[Equation 2]}$$

A transmission power may vary for each of the transmission information $s_1, s_2, \ldots, s_{N_T}$. And, in this case, when each of the transmission power is referred to as $P_1, P_2, \ldots, P_{N_T}$, the transmission information having its transmission power adjusted may be expressed in a vector form as shown below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Also, by using a diagonal matrix P of the transmission power, $\hat{s}$ may be indicated as shown below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, consideration will be made on the configuration of $N_T$ number of transmitted signals $x_1, x_2, \ldots, x_{N_T}$ that are actually being transmitted, when a weight matrix W is applied to the information vector $\hat{s}$ having its transmission power adjusted. Herein, the weight matrix W performs the role of adequately distributing transmission information to each antenna in accordance with the transmission channel status (or situation). Such transmitted signals $x_1, x_2, \ldots, x_{N_T}$ may be expressed as shown below by using the vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Herein, $W_{ij}$ represents a weight between an $i^{th}$ transmission antenna and a $j^{th}$ information. W is referred to as a Weight Matrix or a Precoding Matrix.

When $N_R$ number of reception antennae exist, the receiving signals (or reception signals) $y_1, y_2, \ldots, y_{N_R}$ may be expressed as shown below by using a vector.

$$y = [y_1, y_2, \ldots, y_{N_R}]^T \quad \text{[Equation 6]}$$

In case of modeling a channel in a multiple antenna wireless communication system, the channel may be differentiated in accordance with a transmission/reception antenna index. A channel passing from transmission antenna j to reception antenna i will be indicated as $h_{ij}$. It should be noted that, in $h_{ij}$, an order of the index corresponds to reception antenna index first and transmission antenna index next.

Meanwhile, FIG. 6(b) illustrates a channel from $N_T$ number of transmission antennae to reception antenna i. The channel may be grouped to be expressed in the form of a vector and matrix. In FIG. 6(b), a channel communicating from a total of $N_T$ number of transmission antennae and arriving at reception antenna i may be expressed as shown below.

$$h_i^T = [h_{i1}, h_{i2}, \ldots, h_{iN_T}]$$ [Equation 7]

Accordingly, all channels communicating from $N_T$ number of transmission antennae and arriving at $N_R$ number of reception antennae may be expressed as shown below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_T 1} & h_{N_T 2} & \cdots & h_{N_T N_T} \end{bmatrix}$$ [Equation 8]

In an actual channel, an AWGN (Additive White Gaussian Noise) is added after passing through a channel matrix. The AWGN $n_1, n_2, \ldots, n_{N_R}$ being added to each of the $N_R$ number of reception antennae may be expressed as shown below.

$$n = [n_1, n_2, \ldots, n_{N_R}]^T$$ [Equation 9]

The receiving signal may be expressed as shown below by using the above-described equation modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_T 1} & h_{N_T 2} & \cdots & h_{N_T N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_T} \end{bmatrix} =$$ [Equation 10]

$$Hx + n$$

Meanwhile, a number of rows and columns in a channel matrix H, which indicates a channel status, may be decided by the number of transmission/reception antennae. In the channel matrix H, the number of rows is the same as the number of reception antennae $N_R$, and the number of columns is the same as the number of transmission antennae $N_T$. More specifically, the channel matrix H becomes matrix $N_R \times N_T$.

A rank of a matrix is defined as a minimum number of rows or columns, each being independent from one another. Accordingly, the rank of a matrix cannot be greater than the number of rows or columns. A rank (rank(H)) of channel matrix H will be limited as shown below.

$$\text{rank}(H) \leq \min(N_T, N_R)$$ [Equation 11]

Another definition of the rank may be defined by a number of Eigen values that are not equal to 0, when an Eigen value decomposition is performed. Similarly, yet another definition of the rank may be defined by a number of singular values that are not equal to 0, when a singular value decomposition is performed. Therefore, the physical meaning of a rank of a channel matrix may correspond to a maximum number of information, each being different from one another, that can be transmitted in a given channel.

1. 3. Multiple User-MIMO

MU-MIMO (Multiple User-MIMO) refers to an operation performed by a base station, which is equipped with multiple antennae, for simultaneously serving multiple users (user equipments). When multiple users receive service from a single base station at the same time, the signal of one user equipment may act as interference to another user equipment. And, therefore, this may cause degradation in the overall system performance. Therefore, in order to properly perform data transmission/reception in accordance with the MU-MIMO operations, inter-user interference is required to be removed (or eliminated). In order to do so, the base station may perform signal processing respective to an interference removing method on a signal that is to be transmitted to multiple users.

The base station may respectively encode an information block that is to be transmitted to each user equipment as an independent codeword. The encoded codewords may be transmitted in accordance with the interference removing method. For example, with respect to the codewords being transmitted to multiple user equipments from one base station, the base station may perform transmission by using a method of removing (or eliminating or subtracting) interference in advance. By performing pre-subtraction of a signal being transmitted to one user equipment ($U_1$) from a signal being transmitted to anther user equipment ($U_2$), the other user equipment ($U_2$) may receive the signal, which is transmitted from the base station, as though interference does not exist. And, therefore, a separate interference eliminating (or subtracting) operation may not be required to be performed. As the method for eliminating (or subtracting) interference, ZF-DPC (Zero Forcing-Dirty Paper Coding), ZF (Zero Forcing), and so on, may be applied.

Hereinafter, ZF-DPC will first be described. When it is assumed that 2 user equipments ($U_1$ and $U_2$) are serviced by on base station at the same time, the channel used herein may be referred to as a composite channel $H = [h_1 \text{ and } h_2]$ consisting of a channel (h1) of $U_1$ and a channel (h2) of $U_2$. When LQ decomposition is performed on the above-described composite channel H, as shown below in Equation 12, the composite channel H may be decomposed to a lower triangular matrix L and an orthogonal matrix Q.

$$H = LQ = \begin{bmatrix} l_{11} & 0 \\ l_{21} & l_{22} \end{bmatrix} \begin{bmatrix} q_{11} & q_{12} \\ q_{21} & q_{22} \end{bmatrix}$$ [Equation 12]

In Equation 12, when MIMO transmission is performed by using a column of matrix Q as a beamforming vector, only the lower triangular matrix L remains in the signal, which is received by the user equipment. In case the base station is aware of (or informed of) all channel environment respective to each of the user equipments, encoding may be performed by using a method of transmitting an element of the first row, the corresponding element being encoded without interference, while avoiding an interference element of the second row. Herein, when it is given that a beamforming vector $w_i$ respective to each user equipment (i.e., the beamforming vector respective to $U_1$ corresponds to $w_1$, and the beamforming vector respective to $U_2$ corresponds to $w_1$) corresponds to $w_i=q_i$, an effective channel may be indicated as shown below in Equation 13. Accordingly, since a signal that is directed to one user equipment may be transmitted while having is interference pre-subtracted from a signal that is directed to another user equipment, the user equipment may be capable of properly (or correctly) receiving a signal from the base station without any separate operation for eliminating (or subtracting) interference.

$$h_i w_k = \begin{cases} l_{ii} & i = k \\ 0 & i \neq k \end{cases} \quad \text{[Equation 13]}$$

Subsequently, in case of ZF beamforming, interference subtraction may be realized by through a pseudo-inverse on the composite channel H respective to multiple users as shown below in Equation 14.

$$F = H^H (H H^H)^{-1} \quad \text{[Equation 14]}$$

In Equation 14, $X^H$ refers to a hermit matrix respective to matrix X, and $X^{-1}$ refers to an inverse matrix respective to matrix X. Each column of matrix F shown in Equation 14 corresponds to a beamforming vector respective to each user equipment. More specifically, $w_i = f_i$. In this case, the effective channel respective to each user equipment may be expressed as shown below in Equation 15.

$$h_i w_k = \begin{cases} \frac{1}{\|w_i\|} & i = k \\ 0 & i \neq k \end{cases} \quad \text{[Equation 15]}$$

In case of using the above-described ZF method, since the channel respective to each user equipment is configured to have the form of an identity matrix, eventually, the signal having the interference pre-subtracted may be received.

2. Retransmission Method Using User Relay (UE-Relay)

Generally, an HARQ operation, which is described below, may be applied as a method for controlling data reception failure.

Figure 8:
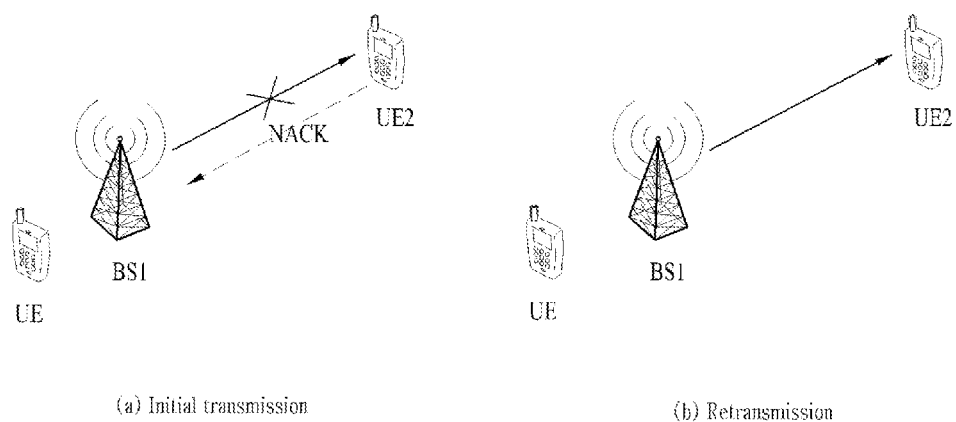
FIG. 8 illustrates an exemplary hybrid automatic retransmission request operation.

FIG. 8 illustrates an exemplary hybrid automatic retransmission request operation.

Referring to FIG. 8, after transmitting one packet from a data transmitting end, when an ACK signal is received from a data receiving end, a new packet may be transmitted, and, when a NACK signal is received, a pre-transmitted packet may be retransmitted. At this point, a packet having encoding according to an FEC (Forward Error Correction) function applied thereto may be retransmitted. Therefore, when the data receiving end receives a packet and decodes the received packet, an ACK signal is transmitted if decoding is successful, and a NACK signal is transmitted if decoding is failed, and the received packet is stored in a buffer. Additionally, when a retransmission packet respective to the NACK signal is received, the received NACK signal is combined with the packet received in the buffer, and by decoding the combined result, a rate of successfully receiving the packet may be increased.

An HARQ method may be divided into a synchronous HARQ method and an asynchronous HARQ method depending upon retransmission timing. In the synchronous HARQ method, retransmission that is performed after a failure in an initial transmission is performed at a time point, which is decided by the system. For example, when retransmission is decided to be performed at each $4^{th}$ time unit (e.g., subframe) after a failure in performing initial transmission, information on the retransmission time point is not required to be additionally notified to the receiving end. Therefore, if the data transmitting end receives a NACK signal, a packet is retransmitted at each $4^{th}$ time unit up to a point when an ACK signal is received. Meanwhile, according to the asynchronous HARQ method, information on the retransmission time point is separately scheduled. Accordingly, a retransmission time point of a packet corresponding to the NACK signal may be varied by diverse factors, such as channel status, and so on.

Additionally, depending upon whether or not the channel status is reflected with respect to an amount of resource that is used for the retransmission, the HARQ method may be divided into an adaptive HARQ method and a non-adaptive HARQ method. In the non-adaptive HARQ method, an MCS level of the packet that is being retransmitted, a number of resource blocks that are being used, and so on, are realized as decided at the time of performing initial transmission. For example, when the transmitting end transmits data by using 8 resource blocks at the time of performing initial transmission, when performing retransmission in a later process, the transmitting end performs retransmission by using 8 resource blocks as well. Meanwhile, the adaptive method corresponds to a method, wherein modulation scheme of a packet, a number of resource blocks that are used, and so on, vary in accordance with the channel status. For example, even if transmission is initially performed by using 8 resource blocks, with respect to the channel status in a later process, a number of resource blocks that is greater or smaller than 8 may be used to perform retransmission.

In performing data packet transmission via the above-described HARQ, the transmitting end converts the data packet to a sub-packet having a predetermined size, and, then, initial transmission and retransmission may be performed in sub-packet units. The receiving end may combine multiple sub-packets and may then attempt to perform packet decoding.

The multiple sub-packets, which are used for the initial transmission and the retransmission according to the HARQ method, are generated from one codeword packet. At this point, the multiple generated sub-packets may be differentiated by a length of a sub-packet and a starting point of a sub-packet. A sub-packet that can be differentiated as described above is referred to as an RV (Redundancy Version). By receiving different RVs and by combining the received RVs, the receiving end may attempt to perform decoding on the overall codeword. For example, an HARQ operation may be performed as a method for receiving a number of RVs, which corresponds to a difference between a number of the overall codeword packets that are to be received and a number of sub-packets that are already received, and attempting to decode the received RVs. And, herein, this method may be referred to as an HARQ operation of an IR (Incremental Redundancy) method.

The above-described related art retransmission method is disadvantageous in that performance may be degraded in case retransmission is frequently performed as in the cell boundary users. More specifically, in case of a user located at a cell boundary, its signal intensity is weak due to its position being located at a distance further away from the base station, and interference caused by a neighboring cell is strong. And, therefore, even if the amount of information is enhanced by receiving a retransmission signal from the base station, the cell boundary user may have difficulty in recovering information. Additionally, when retransmission is performed through the base station, since the base station performs retransmission by using resources that are allocated for the purpose of performing retransmission, when retransmission is performed, it may be disadvantageous in that separate resources are used, thereby causing transmission efficiency in the overall system to be degraded.

In the present invention, when servicing cell boundary users in a single-cell environment or a multi-cell environment, a method of having a neighboring user equipment perform the function of a relay node may be considered. Such relay node may be referred to as a user relay (UE-relay).

Hereinafter, it will be assumed that the base station is equipped with multiple antennae and that the base station can support MU-MIMO transmission, and it will also be assumed that each user equipment is equipped with a single antenna. However, such assumption is merely an example that is given to provide clarity in the description. And, therefore, it will be apparent that the principles of the present invention, which will hereinafter be described in detail, may be equally applied to user equipment(s) being equipped with multiple antennae.

2. 1. Multi-Cell Environment

Figure 9:
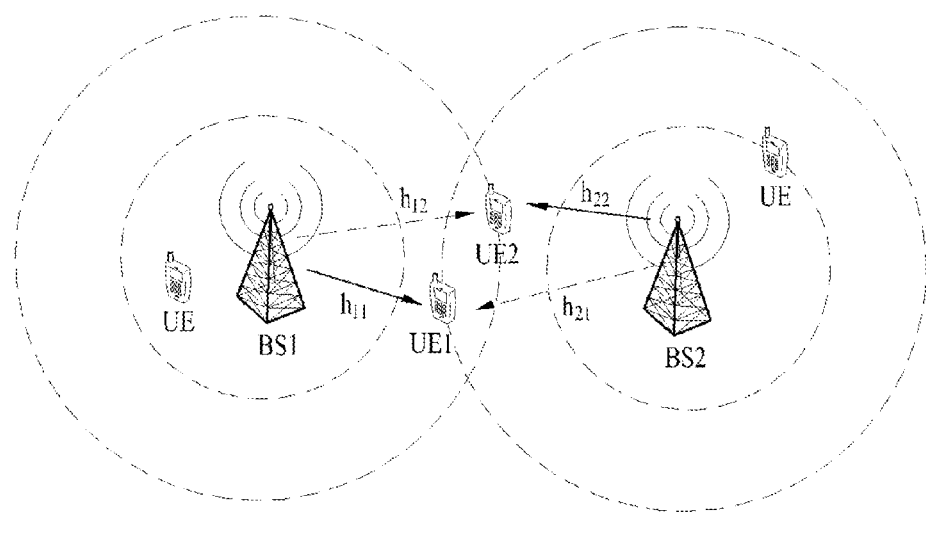
FIG. 9 illustrates an exemplary retransmission method by using a user relay in a multi-cell environment according to an exemplary embodiment of the present invention.
Figure 9:
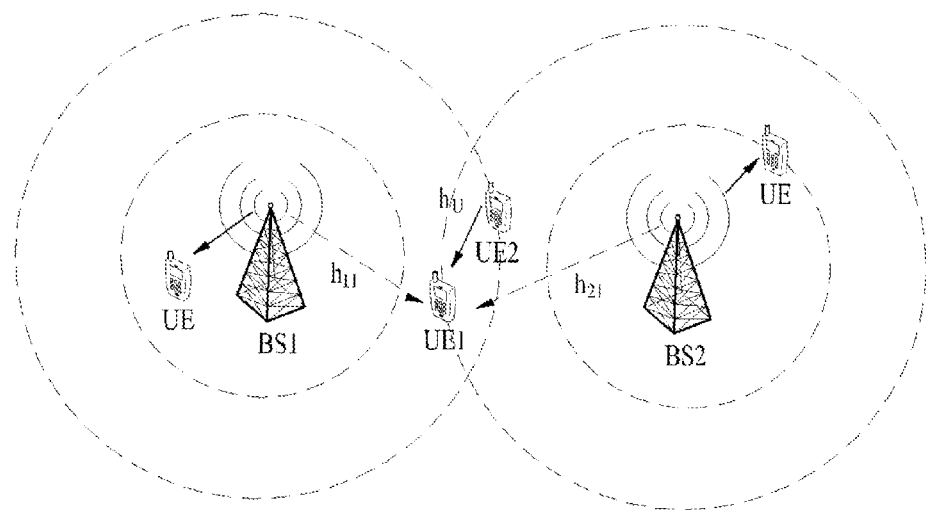

FIG. 9 illustrates an exemplary retransmission method by using a user relay in a multi-cell environment according to an exemplary embodiment of the present invention.

Referring to FIG. 9, first of all, as shown in (a) of FIG. 9, each of base station (BS 1) and base station 2 (BS 2) services a user equipment (UE 1 and UE 2), which are located in the cell boundary respective to each user equipment. At this point, user equipment 1 (UE 1) receives neighboring (or adjacent) cell interference from base station 2 (BS 2), and user equipment 2 (UE 2) receives neighboring (or adjacent) cell interference from base station 1 (BS 1). In the above-described environment, in case user equipment 2 (UE 2) achieves its target rate and successfully receives information, and, in case user equipment 1 (UE 1) fails to recover information due to a low intensity of the signal being received from base station 1 (BS 1), and due to a neighboring cell interference generated from base station 2 (BS 2), retransmission of the neighboring cell user is performed as shown in (b) of FIG. 9. More specifically, user equipment 2 (UE 2) may be operated as a user relay (UE relay). User equipment 2 (UE 2) retransmits the signal, which user equipment 2 (UE 2) has successfully recovered, to user equipment 1 (UE 1), and user equipment 1 (UE 1) recovers the signal that is retransmitted from user equipment 2 (UE 2), and, then, user equipment 1 (UE 1) attempts to recover information by subtracting (or eliminating) interference/combining signals by using an interference subtraction (or elimination) method/signal combination method). In case such retransmission occurs, by scheduling the base stations to service inner cell (cell inner) users, influence of the interference generated by the retransmission on the system performance may be reduced.

Figure 10:
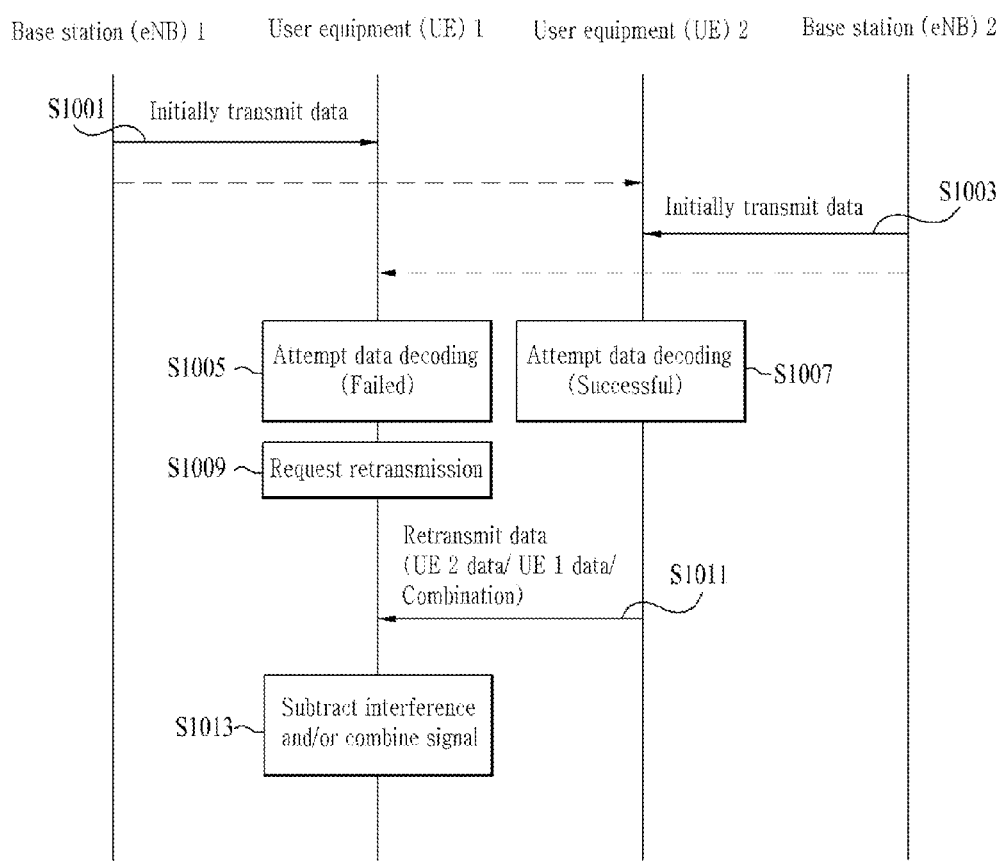
FIG. 10 illustrates a flow chart of an exemplary retransmission method by using a user relay in a multi-cell environment according to an exemplary embodiment of the present invention.

FIG. 10 illustrates a flow chart of an exemplary retransmission method by using a user relay in a multi-cell environment according to an exemplary embodiment of the present invention.

Referring to FIG. 9 and FIG. 10, in a situation of servicing cell boundary users in a multi-cell environment, base station 1 (BS 1) and base station 2 (BS 2) initially transmits information (downlink data) to user equipment 1 (UE 1) and user equipment 2 (UE 2), which are located in the cell boundary respective to each base station (S1001, S1003). In FIG. 10, dotted lines illustrate interference received from each neighboring cell, and UE 1 and UE 2 respectively receive signals transmitted from BS 1 and BS 2 and receive interference from the neighboring cell.

Thereafter, each user equipment (UE 1 and UE 2) attempts to perform decoding of the receive data (S1005, S1007). Hereinafter, for simplicity in the description, it will be assumed that user equipment 1 (UE 1) fails to perform data decoding, and that user equipment 2 (UE 2) successfully performs data decoding.

The amount of information received by each UE 1 and UE 2 from the respective base station via initial transmission is calculated by using each of Equation 16 and Equation 17 shown below.

$$R_1^{(1)} = \log\left(1 + \frac{P_1|h_{11}|^2}{N_0 + P_2|h_{21}|^2}\right) \quad \text{[Equation 16]}$$

$$R_2^{(1)} = \log\left(1 + \frac{P_2|h_{22}|^2}{N_0 + P_1|h_{12}|^2}\right) \quad \text{[Equation 17]}$$

Herein, each of $P_1$ and $P_2$ respectively represent power of signals transmitted from base station 1 and base station 2. $h_{11}$ and $h_{12}$ respectively indicate a channel between base station 1 and user equipment 1 and a channel between base station 1 and user equipment 2, and $h_{21}$ and $h_{12}$ respectively indicate a channel between base station 2 and user equipment 1 and a channel between base station 2 and user equipment 2. Additionally, $N_0$ represents a power of an AWGN (Additive White Gaussian Noise) in each user equipment.

In the above-described environment, in case user equipment 2 (UE 2) achieves its target rate and successfully receives information, and, in case user equipment 1 (UE 1) fails to recover information due to a low intensity of the signal being received from base station 1 (BS 1), and due to a neighboring cell interference generated from base station 2 (BS 2), inter-user retransmission may be performed. More specifically, when it is given that the target transmission rate of user equipment 1 and the target transmission rate of user equipment 2 respectively correspond to $R_1$ and $R_2$, in case of Equation 18 shown below, user equipment 1 may not be capable of recovering information due to an insufficient amount of information, whereas, in case of Equation 19, user equipment 2 may successfully recover information by gaining a sufficient amount of information.

$$R_1^{(1)} < R_1 \quad \text{[Equation 18]}$$

$$R_2^{(1)} \geq R_2 \quad \text{[Equation 19]}$$

In case user equipment 1 has failed to recover information, whereas, in case user equipment 2 has successfully recovered information, user equipment 1 requests for a retransmission (S1009). At this point, user equipment 1 may store the information received from the base station to a buffer and may, then, request user equipment 2 for a retransmission. When user equipment 1 transmits a signal requesting for a retransmission, user equipment 2 of a neighboring cell receives the retransmission request, or by using an exchange of the retransmission request information between the base stations, user equipment 2 performs retransmission to user equipment 1, as shown in (b) of FIG. 9. Herein, user equipment 2 may directly receive a retransmission request signal from user equipment 1, or user equipment 2 may overhear a retransmission request signal (e.g., NACK signal), which is transmitted from user equipment 1 to base station 1, and may then receive the retransmission request signal from user equipment 1. Additionally, the retransmission request signal transmitted from user equipment 1 to base station 1 may be delivered to base station 2, and user equipment 2 may also receive a retransmission request signal from base station 2.

After receiving the retransmission request from user equipment 1, user equipment 2 may transmit its own data (data of user equipment 2) that have successfully been recovered or data of user equipment 1 or a combination of its own data (data of user equipment 2) that have successfully been recovered and the data of user equipment 1 to user equipment 1 (S1011). Herein, a retransmission method performed by user equipment 2 to user equipment 1 may be pre-decided and, therefore, known in advance by the base stations and the user equipments, and each base station may also transmit predetermined information related to the retransmission method through higher layer messages, and so on, to user equipments, which are serviced by the respective base station, thereby notifying the corresponding user equipments of the retransmission method.

Hereinafter, 3 different retransmission methods will be described in detail.

1) User equipment 2 transmits its own data that have successfully been recovered, i.e., a neighboring cell interference element, which obstructed the information recovery of user equipment 1 at the time of the initial transmission, to user equipment 1 (S1011). At this point, when user equipment 2 performs retransmission to user equipment 1, by providing service to users (user equipments) other than user equipment 1 and user equipment 2 in accordance with the respective scheduling, each base station may minimize spectral efficiency loss, which is caused by the retransmission. Therefore, while receiving the retransmission from user equipment 2, user equipment 1 may receive an inner cell interference generated from base station 1 and a neighboring cell interference generated from base station 2. The amount of information of the user equipment, which has received the interference element from user equipment 2, by using the above-described indirect retransmission message is as shown below in Equation 20.

$$R_1^{(2)} = \log\left(1 + \frac{P_U|h_U|^2}{N_0 + P_1|h_{11}|^2 + P_2|h_{21}|^2}\right)$$ [Equation 20]

Herein, $P_U$ represents power of the signal transmitted from user equipment 2 to user equipment 1, and $h_U$ indicates a channel communicating from user equipment 2 to user equipment 1. Additionally, $N_0$ represents a power of an Additive White Gaussian Noise (AWGN) in each user equipment.

If a status of channel $h_U$ between user equipment 2 and user equipment 1 is better than the channel status from each base station, user equipment 1 may recover the information of user equipment 2, i.e., the interference information. As shown below in Equation 21, in case user equipment 1 has achieved the target transmission rate of user equipment 2, the user equipment successfully performs information recovery by gaining a sufficient amount of information from user equipment 2.

$$R_1^{(2)} \geq R_2$$ [Equation 21]

As described above, when user equipment 1 recovers information of user equipment 2 and gains information of the interference, user equipment 1 may eliminate (or remove or subtract) the interference element from the signal, which is received during the initial transmission by using an SIC (successive interference cancelation) method (S1013). More specifically, user equipment 1 may remove (or eliminate) information of user equipment 2 from the information, which is received during the initial transmission and stored in the buffer. As described above, after removing the interference by using SIC, user equipment 1 may gain an amount of information as shown below in Equation 22.

$$R_1^{(3)} = \log\left(1 + \frac{P_1|h_{11}|^2}{N_0}\right)$$ [Equation 22]

User equipment 1 attempts to recover its own information by using a signal having the interference removed by using the SIC method, and, in case of Equation 23 shown below, user equipment 1 succeeds in performing information recovery.

$$R_1^{(3)} \geq R_1$$ [Equation 23]

2) When user equipment 2 performs retransmission, when the information is recovered by using the SIC method, in addition to the information of user equipment 2, information of user equipment 1 may also be gained.

User equipment 2 may deliver a data element of user equipment 1, which is gained by user equipment 2, to user equipment 1 instead of its own data that have successfully been recovered (S1011). At this point, as described above, at the point when retransmission occurs, each base station services other users in accordance with the respective scheduling. Accordingly, while receiving the retransmission from user equipment 2, user equipment 1 may receive an inner cell interference generated from base station 1 and a neighboring cell interference generated from base station 2.

After receiving a signal element by using the above-described signal retransmission method, user equipment 1 combines the signal (information stored in the buffer), which is received from the base station during the initial transmission, with the signal, which is received from user equipment 2 during the retransmission, by using energy combining (S1013). Herein, by combining the received signal, user equipment 1 may gain an enhanced amount of information as shown below in Equation 24.

$$R_1^{(4)} = \log\left(1 + \frac{P_1|h_{11}|^2}{N_0 + P_2|h_{21}|^2} + \frac{P_U|h_U|^2}{N_0 + P_1|h_{11}|^2 + P_2|h_{21}|^2}\right)$$ [Equation 25]

Herein, $P_U$ represents power of the signal transmitted from user equipment 2 to user equipment 1, and $h_U$ indicates a channel communicating from user equipment 2 to user equipment 1. Additionally, $N_0$ represents a power of an Additive White Gaussian Noise (AWGN) in each user equipment.

As described above, user equipment 1 combines the signals that are gained through a relay between the base station and user equipment 2 and attempts to recover information, and, in case of Equation 25 shown below, user equipment 1 succeeds in performing information recovery.

$$R_1^{(4)} \geq R_1$$ [Equation 25]

Herein, when the retransmission of the interference from user equipment 2 and the signal retransmission are performed at different time points, user equipment 1 may optionally use the retransmission showing a better performance, as shown below in Equation 26.

$$\max(R_1^{(3)}, R_1^{(4)}) \geq R_1 \quad [\text{Equation 26}]$$

As described above, when the two methods are applied at the same time, the method showing a better performed may be optionally used, so as to recover information, thereby gaining a more enhanced information recovery effect.

3) In order to maximize the performances of the above-described indirect retransmission method and signal retransmission method, a method of combining the two retransmission methods may be considered.

In case the channel status between user equipment 1 and user equipment 2 is sufficiently better than a channel situation (or channel status) from the base station, user equipment 2 may transmit an amount of interference element sufficient for recovering interference, and, user equipment 2 may then combine the remaining amount of channel capacity with a signal element, so as to increase the size of the signal of UE1 and may transmit the combined result (S1011). More specifically, the retransmission of the interference and the retransmission of the signal may be performed at the same time point.

User equipment 1 may use the successive interference cancelation (SIC) method to remove an interference element from the signal, which is received during the initial transmission, and, at the same time, by using energy combining, user equipment 1 combines the signal, which is received from the base station during the initial transmission, with the signal, which is received from user equipment 2 during retransmission (S1013). As described above, when the combined signal is transmitted, user equipment 1 may recover the interference, as described above in the interference signal retransmission method, and may gain a signal having no interference by using SIC, and, accordingly, by additionally performing combination via signal retransmission, user equipment 1 may gain an information recovery effect through the enhanced signals.

2. 2. Single Cell Environment

The retransmission method using the above-described user relay may be identically applied in a single cell environment, and, hereinafter, detailed description that is the same as the multi-cell environment will be omitted for simplicity.

Figure 11:
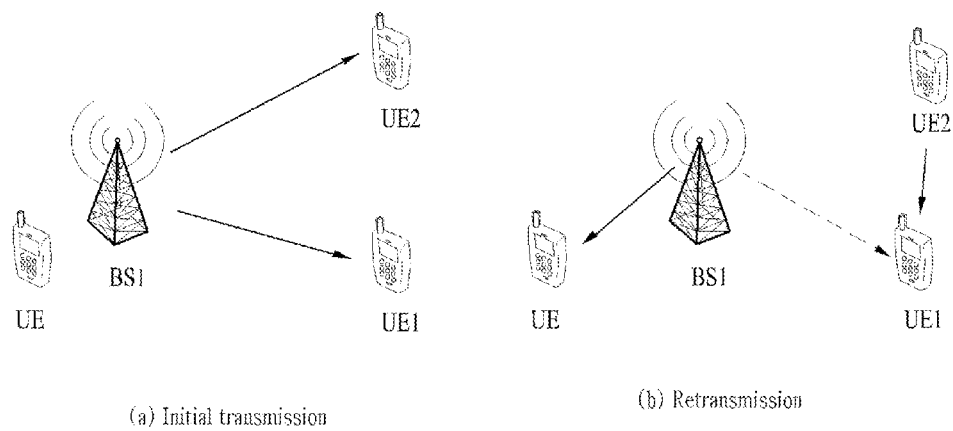
FIG. 11 illustrates an exemplary retransmission method by using a user relay in a single-cell environment according to an exemplary embodiment of the present invention.

FIG. 11 illustrates an exemplary retransmission method by using a user relay in a single-cell environment according to an exemplary embodiment of the present invention.

Referring to FIG. 11, first of all, as shown in (a) of FIG. 11, base station 1 (BS 1) services user equipments (UE 1 and UE 2), which are located in the cell boundary respective to each user equipment. At this point, user equipment 1 (UE 1) receives interference from user equipment 2 (UE 2), and user equipment 2 (UE 2) receives interference from user equipment 1 (UE 1). In the above-described environment, in case user equipment 2 (UE 2) achieves its target rate and successfully receives information, and, in case user equipment 1 (UE 1) fails to recover information due to a low intensity of the signal being received from base station 1 (BS 1), and due to the interference generated from user equipment 2 (UE 2), retransmission of the neighboring user is performed as shown in (b) of FIG. 11. More specifically, user equipment 2 (UE 2) may be operated as a user relay (UE relay). User equipment 2 (UE 2) retransmits the signal, which user equipment 2 (UE 2) has successfully recovered, to user equipment 1 (UE 1), and user equipment 1 (UE 1) recovers the signal that is retransmitted from user equipment 2 (UE 2), and, then, user equipment 1 (UE 1) attempts to recover information by subtracting (or eliminating) interference/combining signals by using an interference subtraction (or elimination) method/signal combination method). In case such retransmission occurs, by scheduling the base stations to service inner cell (cell inner) users, influence of the interference generated by the retransmission on the system performance may be reduced.

Figure 12:
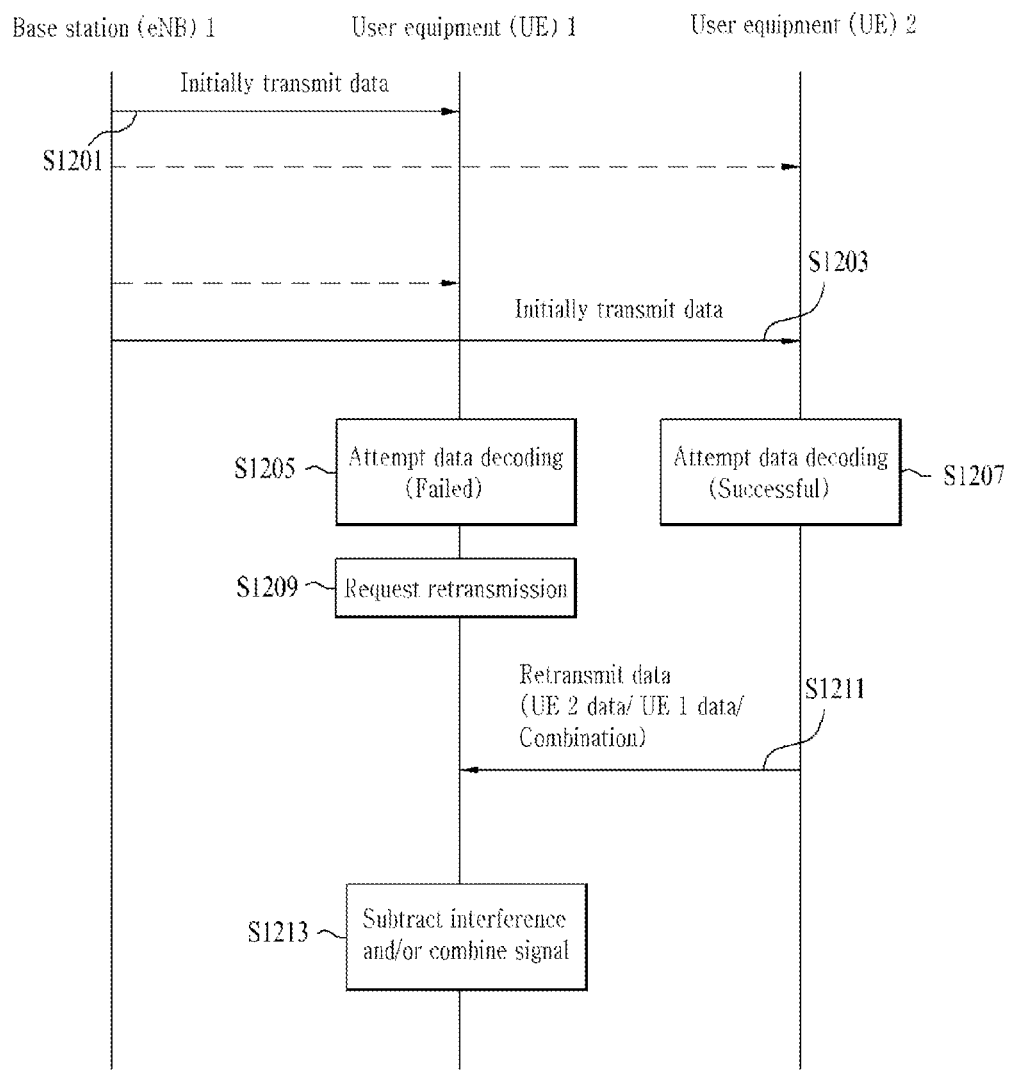
FIG. 12 illustrates a flow chart of an exemplary retransmission method by using a user relay in a single-cell environment according to an exemplary embodiment of the present invention.

FIG. 12 illustrates a flow chart of an exemplary retransmission method by using a user relay in a single-cell environment according to an exemplary embodiment of the present invention.

Referring to FIG. 11 and FIG. 12, base station 1 (BS 1) initially transmits information (downlink data) to user equipment 1 (UE 1) and user equipment 2 (UE 2), which are located in its cell boundary (S1201, S1203). In FIG. 12, dotted lines illustrate interference received from each neighboring user equipment, and UE 1 and UE 2 respectively receive signals transmitted from BS 1 and receive interference from the neighboring user equipment.

Thereafter, each user equipment (UE 1 and UE 2) attempts to perform decoding of the receive data (S1205, S1207). Hereinafter, for simplicity in the description, it will be assumed that user equipment 1 (UE 1) fails to perform data decoding, and that user equipment 2 (UE 2) successfully performs data decoding.

In case user equipment 1 has failed to recover information, whereas, in case user equipment 2 has successfully recovered information, user equipment 1 requests for a retransmission (S1209). At this point, user equipment 1 may store the information received from the base station to a buffer and may, then, request user equipment 2 for a retransmission. When user equipment 1 transmits a signal requesting for a retransmission, user equipment 2 receives the retransmission request, or by using an exchange of the retransmission request information between the base stations, user equipment 2 performs retransmission to user equipment 1, as shown in (b) of FIG. 11. Herein, user equipment 2 may directly receive a retransmission request signal from user equipment 1, or user equipment 2 may overhear a retransmission request signal (e.g., NACK signal), which is transmitted from user equipment 1 to base station 1, and may then receive the retransmission request signal from user equipment 1. Additionally, the retransmission request signal transmitted from user equipment 1 to base station 1 may also be received from base station 1.

After receiving the retransmission request from user equipment 1, user equipment 2 may transmit its own data (data of user equipment 2) that have successfully been recovered or data of user equipment 1 or a combination of its own data (data of user equipment 2) that have successfully been recovered and the data of user equipment 1 to user equipment 1 (S1211). Herein, a retransmission method performed by user equipment 2 to user equipment 1 may be pre-decided and, therefore, known in advance by the base stations and the user equipments, and each base station may also transmit predetermined information related to the retransmission method through higher layer messages, and so on, to user equipments, which are serviced by the respective base station, thereby notifying the corresponding user equipments of the retransmission method.

When user equipment 1 recovers information of user equipment 2 and gains information of the interference, user equipment 1 may eliminate (or remove or subtract) the interference element from the signal, which is received during the initial transmission by using a successive interference cancelation (SIC) method (S1213). Additionally, when user equipment 1 gains its own data (data of user equipment 1) from user equipment 2, user equipment 1 combines the signal (information stored in the buffer), which is received from the base station during the initial transmission, with the signal, which is received from user equipment 2 during the retransmission, by using energy combining (S1213). Additionally, when user equipment 1 receive a combined signal from user equipment 2, user equipment 1 may use the successive interference cancelation (SIC) method to remove an interference element from the signal, which is received during the initial transmission, and, at the same time, by using energy combining, user equipment 1 combines the signal, which is received from the base station during the initial transmission, with the signal, which is received from user equipment 2 during retransmission (S1213).

2. 3. User Scheduling

As described above, even at a time point when retransmission through cooperation (or coordination) between neighboring cell users is being performed, each base station services users (user equipments) other than user equipment 1 and user equipment 2 according to the respective scheduling. Accordingly, degradation in the transmission quality of users being provided with the service from each base station may occur due to interference being generated from each inter-user retransmission. In order to minimize such degradation in performance, the base station is required to perform a new form of user scheduling method based upon the generation of inter-user retransmission. More specifically, considering the likelihood of retransmission occurring at a next time point (e.g., next subframe) immediately following a time point when service is provided only to cell boundary users (e.g., users located at an area where a distance from the base station is equal to or greater than a specific threshold value), the base station may minimize degradation in the performance of the entire system by carrying out scheduling so that service can be provided only to users located at an inner cell, which receives less influence from the interference (e.g., users located at an area where a distance from the base station is equal to or greater than the specific threshold value). Additionally, at the time point when inter-user retransmission is being performed, the base station may schedule user equipments other than the user equipment performing the retransmission at a lower power, so as to reduce influence caused by the interference. Furthermore, as part of a time domain ICIC (Inter-Cell Interference Coordination), the base station may also perform scheduling, so that retransmission using UE-relay according to the present invention can be performed in an ABS (or ABSF: Almost Blank Sub-frame).

3. General Description of a Device to Which the Present Invention may be Applied FIG. 13 illustrates a block view showing a structure of a wireless communication device according to an exemplary embodiment of the present invention.

Figure 13:
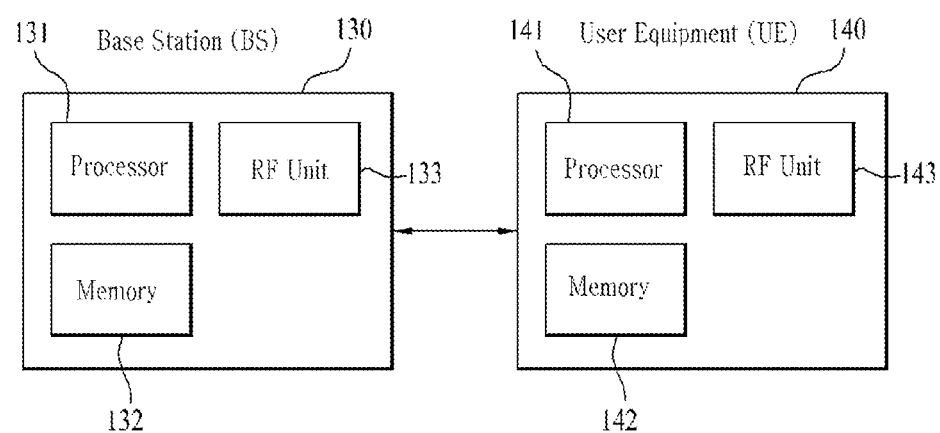
FIG. 13 illustrates a block view of a structure of a wireless communication device according to an exemplary embodiment of the present invention.

Referring to FIG. 13, a wireless communication device includes a base station (130) and multiple user equipments (140) located within the base station (130) area.

The base station (130) includes a processor (131), a memory (132), and an RF module (133). The processor (131) realizes the proposed functions, procedures, and/or methods. Layer of the wireless interface protocol may be realized by the processor (131). The memory (132) is connected to the processor (131) and stores diverse information for operating the processor (131). The RF unit (133) is connected to the processor (131) and transmits and/or receives radio signals.

The user equipment (140) includes a processor (141), a memory (142), and an RF module (143). The processor (141) realizes the proposed functions, procedures, and/or methods. Layer of the wireless interface protocol may be realized by the processor (141). The memory (142) is connected to the processor (141) and stores diverse information for operating the processor (141). The RF unit (143) is connected to the processor (141) and transmits and/or receives radio signals.

The memory (132, 142) may be provided inside or outside of the processor (131, 141) and may be connected to the processor (131, 141) through diverse well-known means. Furthermore, the base station (130) and/or the user equipment (140) may have a single antenna or multiple antennae.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

Although a method for transmitting data in a wireless communication system of the present invention is described based upon an example that can be applied to a 3GPP LTE system, the method of the present invention may also be applied to a variety of other radio access system in addition to the 3GPP LTE system.

What is claimed is:

1. A method for receiving data in a wireless access system, the method comprising:
   when a first user equipment fails to recover data from a first signal being received from a first base station due to an interference caused by a second signal being transmitted from a second base station to a second user equipment, requesting, by the first user equipment, retransmission to the second user equipment, wherein the second user equipment is neighboring the first user equipment and is connected to the second base station neighboring the first base station;
   receiving, by the first user equipment, the second signal from the second user equipment;
   receiving, by the first user equipment, a third signal from the second user equipment, wherein the third signal is the first signal being gained by the second user equipment;
   recovering, by the first user equipment, first recovered data from the first signal by using the second signal;
   recovering, by the first user equipment, second recovered data from the first signal by using the third signal; and
   selecting one of the first and second recovered data which maximizes a target transmission rate,
   wherein a plurality of user equipment other than the first user equipment and the second user equipment are scheduled by the first base station and the second base station at a time point when the second signal and the third signal are transmitted.

2. The method of claim 1, wherein the first recovered data is recovered by subtracting an interference element from the first signal by using the second signal corresponding to the interference element of the first signal.

3. The method of claim 1, wherein the second recovered data is recovered by combining the first signal and the third signal.

4. The method of claim 1, wherein, when each of the first user equipment and the second user equipment is positioned in an area located at a distance equal to or greater than a threshold value from the first base station and the second base station, respectively, the plurality of user equipment other than the first user equipment and the second user equipment are positioned in areas each located at a distance lower than the threshold value from each of the first and second base stations.

5. A first user equipment that receives data in a wireless access system, the first user equipment comprising:
   an RF (Radio Frequency) unit that transmits and receives radio signals; and
   a processor that:
   requests for retransmission to a second user equipment, when the first user equipment fails to recover data from a first signal being received from a first base station due to an interference caused by a second signal being transmitted from a second base station to the second user equipment, wherein the second user equipment is neighboring the first user equipment and is connected to the second base station neighboring the first base station,
   a receives the second signal from the second user equipment,
   receives a third signal from the second user equipment, wherein the third signal is the first signal being gained by the second user equipment,
   recovers first recovered data from the first signal by using the second signal,
   recovers second recovered data from the first signal by using the third signal, and
   selects one of the first and second recovered data which maximizes a target transmission rate,
   wherein a plurality of user equipment other than the first user equipment and the second user equipment are scheduled by the first base station and the second base station at a time point when the second signal and the third signal are transmitted.

6. The user equipment of claim 5, wherein the first recovered data is recovered by subtracting an interference element from the first signal by using the second signal, corresponding to the interference element of the first signal.

7. The user equipment of claim 5, wherein the second recovered data is recovered by combining the first signal and the third signal.

8. The user equipment of claim 5, wherein, when each of the first user equipment and the second user equipment Drell is positioned in an area located at a distance equal to or greater than a threshold value from the first base station and the second base station, respectively, the plurality of user equipment other than the first user equipment and the second user equipment are positioned in areas each located at a distance lower than the threshold value from each of the first and second base stations.

* * * * *